Patented Apr. 28, 1931

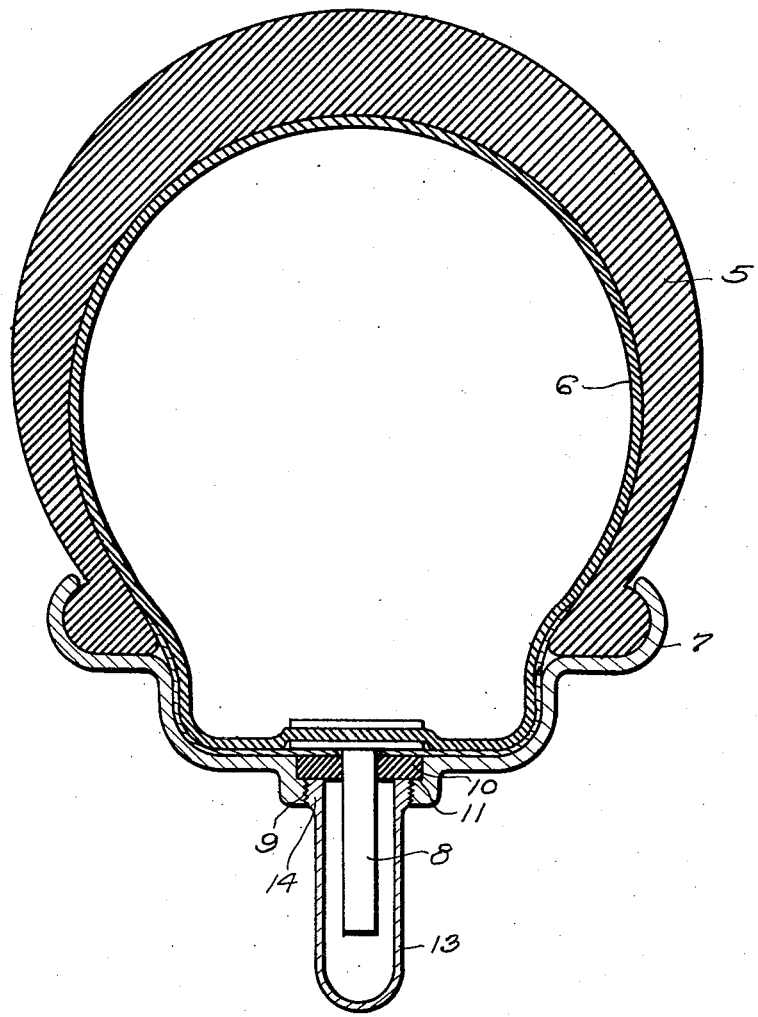

1,802,877

UNITED STATES PATENT OFFICE

JOSEPH THOMAS CRUTE, OF VIRGILINA, VIRGINIA, ASSIGNOR OF ONE-HALF TO MARVIN A. GOODE, OF VIRGILINA, VIRGINIA

PNEUMATIC-TIRE STRUCTURE

Application filed November 4, 1930. Serial No. 493,411.

This invention relates to pneumatic tires and it has for its object to provide an improved type of inflation valve stem, by virtue of which a great deal of the damage now caused to automobile tires, when the latter are run in a deflated condition, may be avoided.

The figure shown in the accompanying drawing is a vertical cross-sectional view of a tire, constructed in accordance with the invention.

Referring to the drawing, 5 designates an automobile casing, 6 the inner tube and 7 the rim upon which the casing is mounted. Heretofore, it has been the practice to make the valve stems of the inner tubes relatively long and to pass them through the holes in the rim which are very little larger in diameter than said valve stems and to place lock nuts upon the said valve stems upon the inner faces of the rims. This, in effect, locks the stem to the rim. The result has been that when the tires have been run in a deflated condition, the inner tubes have been chewed to pieces and the valve stems, in most instances, torn loose from the tubes. The primary purpose of the present invention is to so arrange the parts that the valve stem will readily free itself from the rim if the tire should become deflated, so that the tube may partake of any creeping movement of the casing with respect to the rim and, consequently, the valve stem will not be torn loose from the tube.

I accomplish the result sought by making the valve stem 8 relatively short and passing it through an opening 9 in the rim that is considerably larger in diameter than the valve stem. A rubber, fibre or other moisture-proof washer 10 is seated in a recess 11 of the rim and serves to hold the valve stem in centered relation and to prevent the entry of water or dirt, while at the same time it does not interfere with the functioning of the device. A dust cap 13 may encircle the valve stem 8 and may be threaded into the rim, as indicated at 14. It will be observed that the recess in which the washer 10 is seated is of larger diameter than the opening 9 in which dust cap 13 is threaded, whereby a shoulder is formed upon which the washer 10 rests and when the dust cap is screwed into place its inner end bears upon the washer and aids in supporting the same against the internal pressure in the tire. It is further to be noted that the valve stem 8 is externally smooth, not threaded as is commonly the case. Thus, it may readily be pulled out of the compressed washer 10 if the inner tube becomes deflated and starts to creep.

If the tire should become deflated, it is apparent that the relatively short valve stem will be pulled through the opening 9 and into the interior of the tire casing before the valve stem will pull loose from the tube. It is apparent that the device of this invention will prevent a great deal of the damage at present encountered by motorists from the causes described.

It is to be understood that the invention is not limited to the particular arrangement that I have chosen for purposes of illustration but that it includes within its purview whatever changes fairly come within either the terms or the spirit of the appended claims.

Having described my invention, what I claim is:

1. The combination with a rim and a tire mounted thereon, comprising an inner tube, of a relatively short externally smooth valve stem carried by said inner tube and passing through an opening of the rim, the opening of the rim being of such diameter with respect to the diameter and length of the valve stem as to permit the latter to pass therethrough, even when cocked to an angle, and an elastic, waterproof washer surrounding the valve stem inwardly of the inner tube, said rim being provided with a recessed portion for the reception of said washer and a dust cap covering the valve stem and threaded into the rim.

2. In a pneumatic tire structure, a rim comprising an inwardly directed boss having a recess of one diameter immediately adjacent the tire receiving face of the rim, and an internally threaded opening of smaller diameter directly therebeneath, thereby forming a shoulder, a resilient washer seated in said recess upon said shoulder, a dust cap threaded into said opening, the inner end of which bears upon said washer, an inner tube having a relatively short, externally smooth, valve stem which passes through said washer and upon which said washer fits snugly, the diameter of the valve stem being very much less than the internal diameter of the dust cap and recessed opening in which said washer is seated.

In testimony whereof I affix my signature.

JOSEPH THOMAS CRUTE.